(12) United States Patent
Havlir et al.

(10) Patent No.: US 11,023,997 B2
(45) Date of Patent: Jun. 1, 2021

(54) INSTRUCTION STORAGE

(71) Applicant: Apple Inc., Cupertino, CA (US)

(72) Inventors: Andrew M. Havlir, Orlando, FL (US); Dzung Q. Vu, Austin, TX (US); Liang Kai Wang, Austin, TX (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 15/657,531

(22) Filed: Jul. 24, 2017

(65) Prior Publication Data
US 2017/0323420 A1 Nov. 9, 2017

Related U.S. Application Data

(63) Continuation of application No. 14/746,034, filed on Jun. 22, 2015, now Pat. No. 9,727,944.

(51) Int. Cl.
| | |
|---|---|
| *G06T 1/60* | (2006.01) |
| *G06T 1/20* | (2006.01) |
| *G06F 9/38* | (2018.01) |
| *G06F 9/30* | (2018.01) |
| *G06F 12/08* | (2016.01) |
| *G06F 12/0875* | (2016.01) |

(52) U.S. Cl.
CPC .............. *G06T 1/60* (2013.01); *G06F 9/3017* (2013.01); *G06F 9/30145* (2013.01); *G06F 9/38* (2013.01); *G06F 9/3838* (2013.01); *G06F 9/3851* (2013.01); *G06F 9/3853* (2013.01); *G06F 9/3887* (2013.01); *G06F 12/08* (2013.01); *G06T 1/20* (2013.01); *G06F 12/0875* (2013.01); *G06F 2212/452* (2013.01); *Y02D 10/00* (2018.01)

(58) Field of Classification Search
CPC ............ G06T 15/005; G06T 1/20; G06T 1/60
USPC ....................................................... 345/522
See application file for complete search history.

(56) References Cited

U.S. PATENT DOCUMENTS

| | | |
|---|---|---|
| 5,815,165 A | 9/1998 | Blixt |
| 6,122,638 A | 9/2000 | Huber et al. |
| 6,542,986 B1 | 4/2003 | White |
| 6,751,759 B1 | 6/2004 | Sun et al. |
| 7,003,652 B2 | 2/2006 | Nevill et al. |
| 2006/0179346 A1* | 8/2006 | Bishop ................ G06F 11/1407 714/13 |
| 2006/0282646 A1 | 12/2006 | Dockser |
| 2007/0130447 A1* | 6/2007 | Coon .................... G06F 9/3838 712/215 |

(Continued)

*Primary Examiner* — Jin Ge
(74) *Attorney, Agent, or Firm* — Kowert, Hood, Munyon, Rankin & Goetzel, P.C.

(57) ABSTRACT

Techniques are disclosed relating to low-level instruction storage in a processing unit. In some embodiments, a graphics unit includes execution circuitry, decode circuitry, hazard circuitry, and caching circuitry. In some embodiments the execution circuitry is configured to execute clauses of graphics instructions. In some embodiments, the decode circuitry is configured to receive graphics instructions and a clause identifier for each received graphics instruction and to decode the received graphics instructions. In some embodiments, the caching circuitry includes a plurality of entries each configured to store a set of decoded instructions in the same clause. A given clause may be fetched and executed multiple times, e.g., for different SIMD groups, while stored in the caching circuitry.

20 Claims, 6 Drawing Sheets

(56) References Cited

U.S. PATENT DOCUMENTS

| | | | |
|---|---|---|---|
| 2008/0141253 A1* | 6/2008 | Luick | G06F 9/3001 |
| | | | 718/102 |
| 2009/0210674 A1* | 8/2009 | Luick | G06F 9/30054 |
| | | | 712/216 |
| 2010/0153686 A1* | 6/2010 | Frank | G06F 9/3851 |
| | | | 712/34 |
| 2010/0257340 A1* | 10/2010 | Doing | G06F 9/30145 |
| | | | 712/215 |
| 2010/0274992 A1 | 10/2010 | Chou et al. | |
| 2010/0274994 A1 | 10/2010 | Golla et al. | |
| 2010/0332805 A1* | 12/2010 | Blasco Allue | G06F 9/3836 |
| | | | 712/216 |
| 2011/0119674 A1* | 5/2011 | Nishikawa | G06F 9/5066 |
| | | | 718/103 |
| 2012/0124337 A1* | 5/2012 | Hardage | G06F 9/30112 |
| | | | 712/208 |
| 2012/0173843 A1 | 7/2012 | Kamdar | |
| 2012/0198178 A1 | 8/2012 | Cox et al. | |
| 2012/0304194 A1* | 11/2012 | Engh-Halstevdt | G06F 9/4881 |
| | | | 718/106 |
| 2013/0159628 A1 | 6/2013 | Choquette et al. | |
| 2013/0173886 A1 | 7/2013 | Dockser et al. | |
| 2015/0113538 A1* | 4/2015 | Giroux | G06F 9/5011 |
| | | | 718/104 |
| 2015/0220346 A1* | 8/2015 | Wang | G06F 9/3826 |
| | | | 712/208 |
| 2015/0370566 A1 | 12/2015 | Muff et al. | |

* cited by examiner

INSTRUCTION STORAGE

CROSS REFERENCE TO RELATED APPLICATION

The present application is a continuation of U.S. application Ser. No. 14/746,034, filed Jun. 22, 2015 (now U.S. Pat. No. 9,727,944), which is incorporated by reference herein in its entirety.

BACKGROUND

Technical Field

This disclosure relates generally to graphics processing and more specifically to low-level storage of graphics instructions.

Description of the Related Art

Graphics processing often involves executing the same instruction in parallel for different graphics elements (e.g., pixels or vertices). Further, the same group of graphics instructions is often executed multiple times (e.g., to perform a particular function for different graphics elements or for the same graphics elements at different times). Graphics processors are often included in mobile devices such as cellular phones, wearable devices, etc., where power consumption and processor area are important design concerns.

SUMMARY

Techniques are disclosed relating to instruction storage in a graphics unit.

In some embodiments, a graphics unit includes execution circuitry, decode circuitry, hazard circuitry, and caching circuitry. In some embodiments the execution circuitry is configured to execute clauses of graphics instructions. In some embodiments, the decode circuitry is configured to receive graphics instructions and a clause identifier for each received graphics instruction and to decode the received graphics instructions. In some embodiments, the hazard circuitry is configured to generate hazard information that specifies dependencies between ones of the decoded graphics instructions in the same clause. In some embodiments, the caching circuitry includes a plurality of entries each configured to store a set of decoded instructions for the same clause and hazard information generated by the decode circuitry for the clause.

In some embodiments, a method includes receiving graphics instructions and a clause identifier for each received graphics instruction, decoding the received graphics instructions, generating hazard information that specifies dependencies between ones of the decoded instructions that belong to the same clause, storing sets of instructions belonging to the same clause and the generated hazard information for the sets of instructions, and performing clauses of instructions received from the caching circuitry based on the stored hazard information.

In some embodiments, a graphics unit includes execution circuitry, decode circuitry, caching circuitry, and expansion circuitry. In some embodiments, the execution circuitry is configured to execute clauses of graphics instructions. In some embodiments, the decode circuitry is configured to receive graphics instructions and a clause identifier for each received graphics instruction and to decode the received graphics instructions. In some embodiments, the caching circuitry includes a plurality of entries each configured to store a set of decoded instructions for the same clause and the caching circuitry is a lowest level of instruction storage in the graphics unit relative to the execution circuitry. In some embodiments, the expansion circuitry is configured to receive instructions from the caching circuitry for execution by the execution circuitry and generate, for a received instruction that the execution circuitry is not configured to perform, multiple instructions that are performable by the execution circuitry.

In various embodiments, the disclosed techniques may reduce power consumption, storage area used for low-level graphics instructions, or both.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1A:
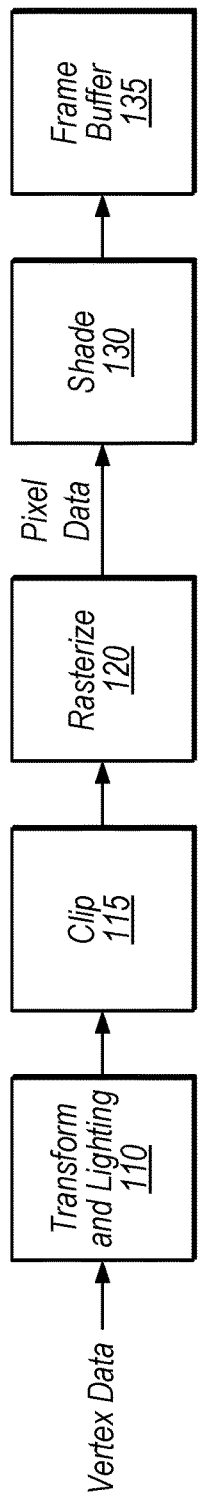
FIG. 1A is a block diagram illustrating an exemplary graphics processing flow.
Figure 1B:
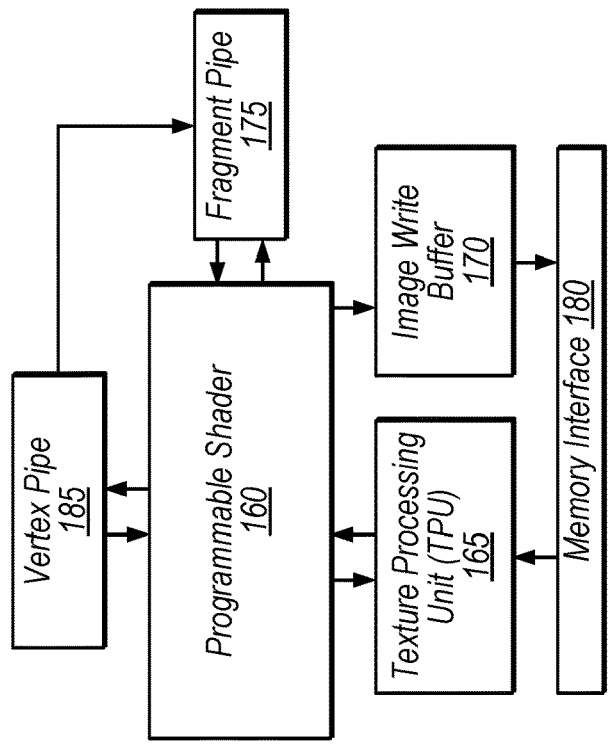
FIG. 1B is a block diagram illustrating one embodiment of a graphics unit.

This disclosure initially describes, with reference to FIGS. 1A-1B, an overview of a graphics processing flow and an exemplary graphics unit. Embodiments of a programmable shader that includes low-level instruction storage are described with reference to FIGS. 2-4. An exemplary device is shown in FIG. 5. In some embodiments, the low-level instruction storage is configured to store hazard information for decoded instructions, which may reduce power consumption. In some embodiments, instruction expansion circuitry is configured to expand certain instructions after retrieving the instructions from the low-level instruction storage, thus allowing for a potential reduction in processor area.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Programmable Shader

Figure 2:
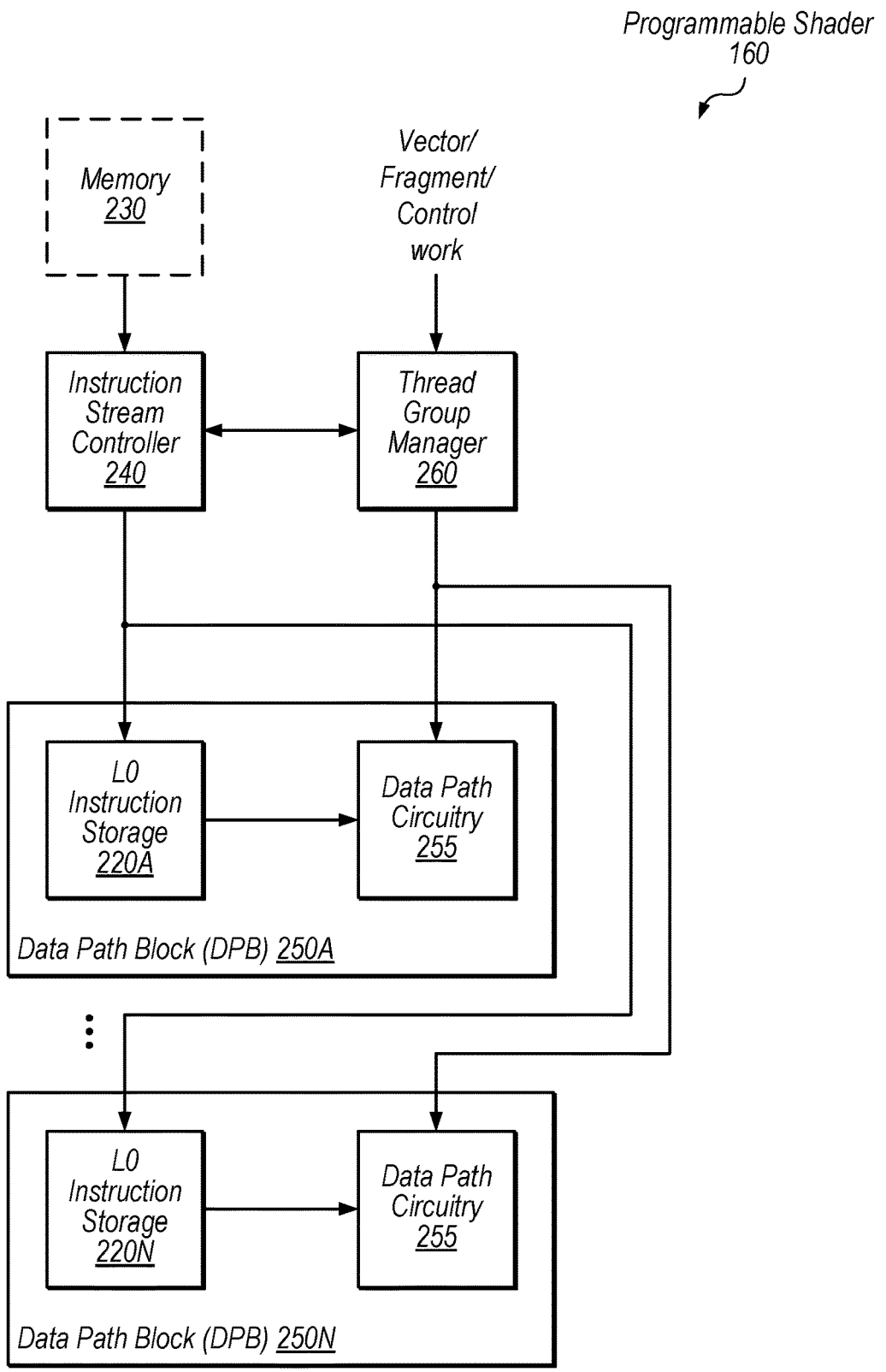
FIG. 2 is a block diagram illustrating a programmable shader in a graphics unit, according to some embodiments.

FIG. 2 shows processing elements of a programmable shader 160, according to some embodiments. In the illustrated embodiment, programmable shader 160 includes instruction stream controller (ISC) 240, thread group manager (TGM) 260, and data path blocks (DPBs) 250A-N. In the illustrated embodiment, each DPB 250 includes L0 instruction storage 220 and one or more data path circuitry blocks 255.

TGM 260, in some embodiments, is configured to receive and schedule at least one of the following types of work: vector work, fragment work, and/or control work. TGM 260 may receive such work from shader programs, for example, and break the work into clauses of instructions. In some embodiments, TGM 260 is a scheduler that maintains a smaller list of active threads from among a larger group of pending threads. TGM 260, in some embodiments, is configured to invoke clauses of instructions for execution in parallel by data path circuitry blocks 255 in DPBs 250.

As used herein, clause-based execution involves the ability to execute a plurality of instructions as a group (i.e., once a clause has been invoked for execution, all instructions in the clause are executed, barring an exception or other error). Clauses may include a single instruction, in some situations, but circuitry configured to perform clause-based execution must be able to handle clauses that include a plurality of instructions. Thus, in some embodiments, clauses may contain varying numbers of instructions from a single instruction to a maximum number of supported instructions.

Instruction stream controller 240, in some embodiments, is configured to group instructions into clauses and TGM 260 may assign the clauses to one or more sets of execution hardware for parallel execution. For example, a particular clause of M instructions may be assigned to a "SIMD group" or "thread group" (these terms are used interchangeably herein) to be executed using N execution modules in parallel (i.e., such that each of the M instructions is executed by N different execution modules using potentially different input data, e.g., for different pixels on a screen). Further, the same clause may be assigned to the same N execution modules multiple different times and/or also assigned for execution by one or more different groups of execution modules. In some embodiments, for a given clause of instructions, TGM 260 is configured to provide, to execution circuitry for parallel execution: a thread group ID, execution state information, and a pointer to relevant instructions (e.g., a pointer to the clause).

Instruction stream controller 240, in the illustrated embodiment, is configured to form clauses of instructions, fetch clauses of instructions from memory 230 (which may or may not be included in the programmable shader), and provide fetched clauses of instructions to an L0 instruction storage 220 in the appropriate DPB 250 for execution. In some embodiments, instruction stream controller 240 is configured to build streams of instructions, where a stream is a list of clauses and may be configured to cache streams of instructions. Instructions may be cached at multiple levels in a cache hierarchy, including L0 instruction storage 220, in ISC 240 (not shown) and/or other levels in GPU 150. In some embodiments, instructions are cached at clause granularity at the L0 level and cached at stream granularity at one or more higher levels.

DPBs 250, in the illustrated embodiment, each include L0 instruction storage 220 configured to store clauses of instructions and data path circuitry 255 configured to execute instruction clauses for different thread groups.

Exemplary L0 Storage and Shader Pipeline

Figure 3:
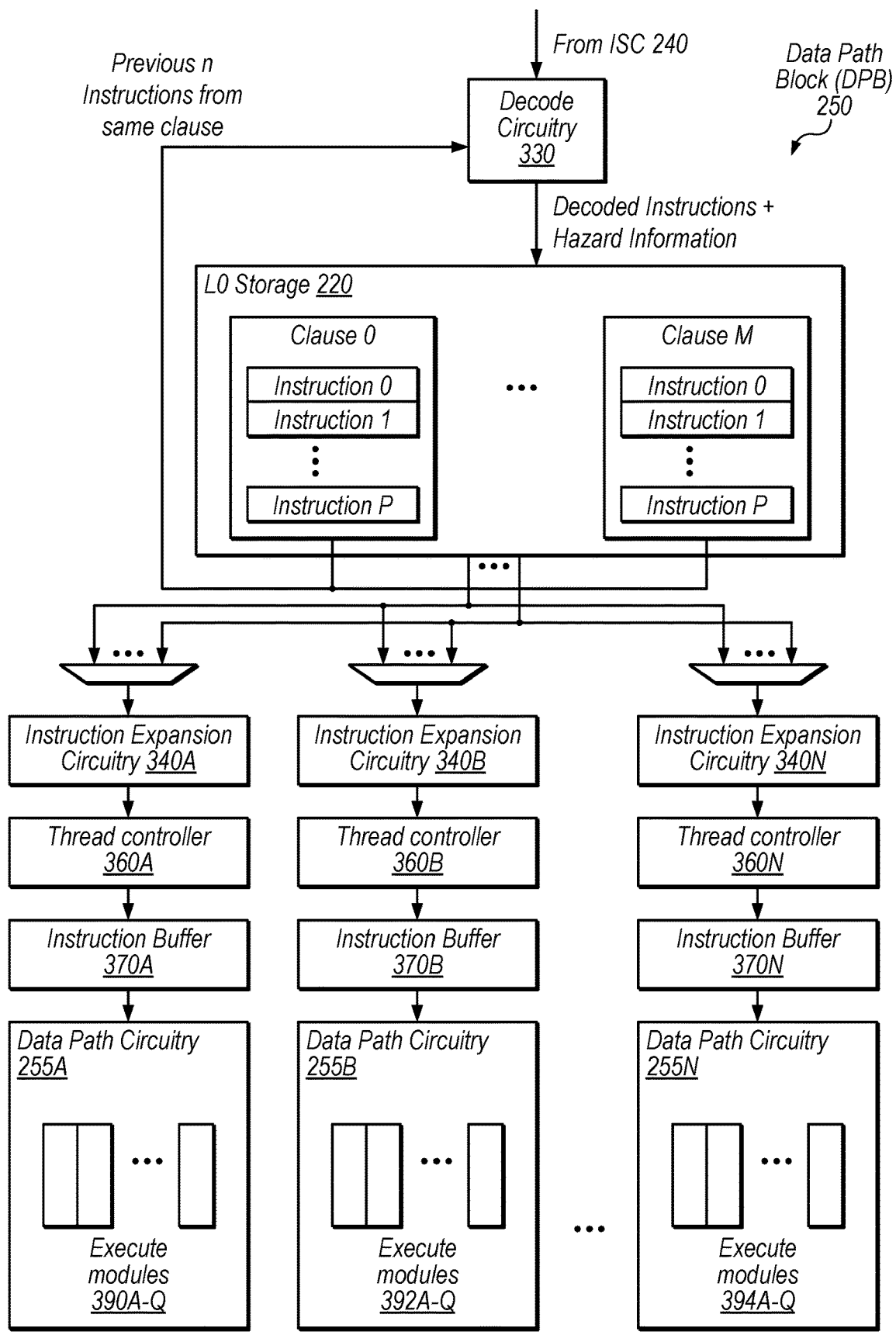
FIG. 3 is a block diagram illustrating a data path block that includes a L0 storage element, according to some embodiments.

FIG. 3 shows an exemplary embodiment of a DPB 250 that includes L0 instruction storage 220. In the illustrated embodiment, DPB 250 also includes decode circuitry 330, instruction expansion circuitry 340A-N, thread controllers 360A-N, instruction buffers 370A-N, and data path circuitry 255A-N. In the illustrated embodiment, each instance of data path circuitry 255 includes a plurality of execute modules 390 A-Q configured to execute a given instruction in parallel for different input data belonging to the same SIMD group.

L0 instruction storage 220, in the illustrated embodiment, includes multiple entries, each configured to store a set of instructions in the same clause. In these embodiments, the number of instructions included in a given clause may vary from a single instruction to the maximum number of instructions available in an entry of L0 storage 220. In different embodiments, L0 storage 220 may include storage for different numbers of clauses. Each entry configured to store clauses may include storage for the maximum number of instructions per clause (a design parameter which may vary in different embodiments). For example, L0 storage 220 may be configured to store two, four, eight, 16, etc. clauses of up to four, five, eight, sixteen, etc. instructions each. In some embodiments, L0 storage 220 may be indexed using a clause ID having an appropriate number of bits to uniquely identify each stored clause (e.g., 4 bits if L0 Storage 220 is configured to store 16 clauses of instructions) and an instruction number having an appropriate number of bits to uniquely identify each instruction in a given clause (e.g., 4 bits if each clause is permitted to include up to 16 instructions). In some embodiments, the maximum number of clauses and the number of instructions per clause in L0 storage 220 may be configurable. For example, L0 storage may operate in a first mode with four clauses of four instructions each, a second mode with eight clauses of two instructions each, etc.

In some embodiments, L0 storage 220 implements a large number of read ports to provide instructions to data path circuitry. For example, in some embodiments, L0 storage 220 includes two read ports for each instance of data path circuitry 255. In order to provide a sufficient number of read ports, the entries in L0 storage 220 are implemented using latches and/or flip-flops, in some embodiments. In some embodiments, L0 storage 220 is accessed by changing an address on one or more read multiplexers (not shown). In the illustrated embodiment, L0 storage 220 is the lowest level of instruction storage in a cache/memory hierarchy for storing instruction data (other higher levels may include one or more caches in ISC 240, memory 230, etc.). Storing instructions at the clause granularity, at the lowest level, may reduce power consumption by allowing clauses to be executed multiple times for different thread groups, in some embodiments.

Decode circuitry 330, in some embodiments, is configured to receive, from ISC 240, program instructions defined by a given instruction set architecture (ISA) and a clause ID for each instruction. In some embodiments, decode circuitry 330 is configured to receive one ISA instruction each cycle. In some embodiments, decode circuitry 330 is configured to decode the instructions into a format used by data path circuitry 255, resolve instruction hazards, and store the instructions along with hazard information in L0 storage 220. In some embodiments, decode circuitry 330 is configured to maintain an instruction count state for each clause, in order to write decoded instructions to the correct location in a corresponding entry in L0 storage 220.

In the illustrated embodiment, decode circuitry 330 is configured to compare one or more operands (which may include input and/or result operands) of an instruction being decoded to operations from "n" previous instructions from the same clause, wherein "n" is an integer. In some embodiments, "n" corresponds to the number of entries configured to store instructions in a given instruction buffer 370. In some embodiments, hazards need not be checked for older instructions, as they will be completed before performance of the instruction being decoded. Based on the comparison, decode circuitry 320 may generate hazard information indicating dependencies between instructions. In these embodiments, data path circuitry 255 may stall instructions based on the hazard information and/or take any of various other appropriate actions to avoid the detected hazards. In various embodiments, decode circuitry 330 is configured to store the hazard information in L0 storage 220 along with the decoded instruction. Storing hazard information for clauses of instructions in a low-level cache may significantly reduce power consumption, in some embodiments, because the hazard information is determined once for the clause and then used for multiple invocations of the clause, which consumes less power than determining the hazard information for each invocation of the clause.

As used herein, the term "hazard information" is intended to be construed according to its well understood meaning which includes information that specifies dependencies between instructions. For example, if instruction 1 writes to register A and instruction 2 reads from register A, then instruction 2 is dependent on instruction 1 and cannot get its input data until instruction 1 has generated the result to be written to register A. Hazard information may indicate dependencies using any of various appropriate encodings, in various embodiments.

Instruction expansion circuitry 340, in some embodiments, is configured to receive instructions from L0 storage 220 that are to be executed by one of the instances of data path circuitry 255. In some embodiments, the instances of data path circuitry 255 are configured to execute a particular subset (i.e., less than all) of the instructions specified by an instruction set architecture (ISA) supported by graphics unit 150. Circuitry 255 can thus be said to "natively" execute the particular subset of the ISA. For example, an ISA may define a 32-bit math instruction. If circuitry 255 is configured to execute such an instruction as is (e.g., because circuitry 255 has a 32-bit wide data path), the instruction can be considered to be an instruction that is native to data path circuitry 255. On the other hand, consider a hypothetical 64-bit math instruction defined by the same ISA. If data path circuitry 255 is not configured to execute such an instructions in its unmodified form (e.g., because it does not have a data path that is 64 bits wide), such an instruction can be considered to be non-native to data path circuitry 255. Instruction expansion circuitry 340 is configured to expand such non-native instructions into multiple native instructions (e.g., by expanding a 64-bit math instruction into multiple 32-bit math instructions that are executable to achieve the result of the 64-bit math instruction). Exemplary expansions include, without limitation, expanding an add instruction into two smaller add operations and expanding a multiply instruction into four smaller multiply operations. In some embodiments, native instructions that data path circuitry 255 is configured to execute are simply passed on by instruction expansion circuitry 340, without modification.

As shown, in some embodiments, instruction expansion circuitry 340 is placed after L0 storage 220 in the pipeline, such that instructions stored in L0 storage 220 are not expanded. Note that taken alone, placing circuitry 340 after L0 storage 220 in the pipeline will slightly increase power consumption relative to performing instruction expansion prior to L0 storage 220 because non-native instructions in an instruction clause that is executed multiple times must be expanded each time after being received from L0 storage 220. This impact may be small, however, in typical situations where non-native instructions are uncommon. Further, placing circuitry 340 before L0 storage 220 would greatly increase the storage required for L0 storage 220 For example, in embodiments in which instruction expansion circuitry 340 is located prior to L0 storage 220 in the pipeline (i.e., in an earlier pipeline stage) and is configured to expand instructions into at most four corresponding native instructions and clauses are allowed to include up to 8 instructions, each entry in L0 storage 220 would need to include sufficient storage for up to 32 native instructions, which would require significant processor area and potentially consume considerable power. In contrast, in the illustrated embodiment, if clauses are allowed to include up to 8 instructions, each entry in L0 storage 220 need include only storage for up to 8 ISA instructions.

Thread controllers 360A-N, in some embodiments, are configured to determine when to retrieve instructions from L0 storage 220 for execution by data path circuitry 255 (connections for signaling up the pipeline not shown). In some embodiments, instruction expansion circuitry 340 is configured to indicate to a corresponding thread controller 360 when it is expanding an ISA instruction, which may allow the thread controller 360 to maintain a correct instruction count state and determine when execution of a clause is completed. For example, instruction expansion circuitry 340 may notify the thread controller 360 when it first identifies an instruction that needs expansion. Instruction expansion circuitry 340 may also indicate when there are more expanded instructions coming in later cycles (e.g., depending on the size of the non-native instruction). In some embodiments, thread controller 360 is configured to notify TGM 260 when execution of a given clause is completed. In some embodiments, thread controller 360 is configured to wait to request new instructions when instructions expansion circuitry 340 is busy.

Instruction buffers 370A-N, in the illustrated embodiment, are configured to store instructions for execution by data path circuitry 255.

Data path circuitry instances 255A-N, in the illustrated embodiment, each include multiple execute modules 390A-Q, 392A-Q, or 394A-Q configured to perform instructions in parallel. Each execute module 390 may include one or more ALUs, floating-point units, shift units, etc. In some embodiments, each execute module 390 includes a 16-bit ALU while the execute modules 390A-Q in a given instance of data path circuitry 255 share one or more 32-bit ALUs. In the illustrated embodiment, single-instruction multiple-data (SIMD) execution is performed by executing the same instruction using from 1 to Q execute modules, where the different execute modules can use different input data (e.g., different input registers) for execution of the same instruction in parallel. In some embodiments, TGM 260 is configured to invoke clauses of instructions to operate on the data associated with thread group IDs, and the thread group IDs may identify the DPB 250 and data path circuitry 255 that will be used to execute the clause. In other words, in these embodiments, the size of SIMD groups corresponds to the number of execute modules in each instance of data path circuitry 255. Thus, in various embodiments, the value of integer Q may correspond to the SIMD width and may be 2, 4, 6, 8, 16, or any appropriate number and may be configurable.

Exemplary Method

Figure 4A:
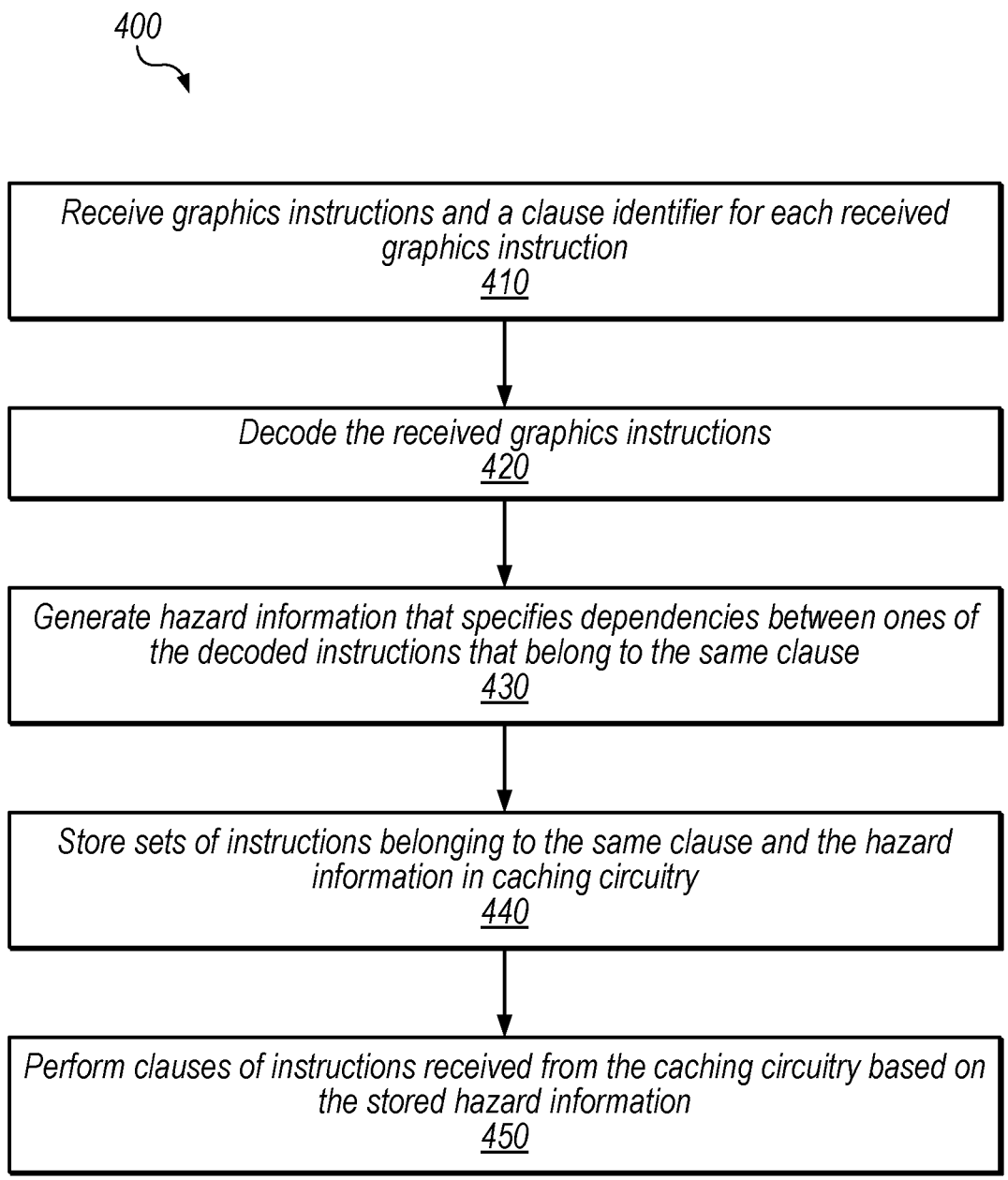
FIGS. 4A-4B are flow diagrams illustrating methods for using low-level instruction storage, according to some embodiments.
Figure 5:
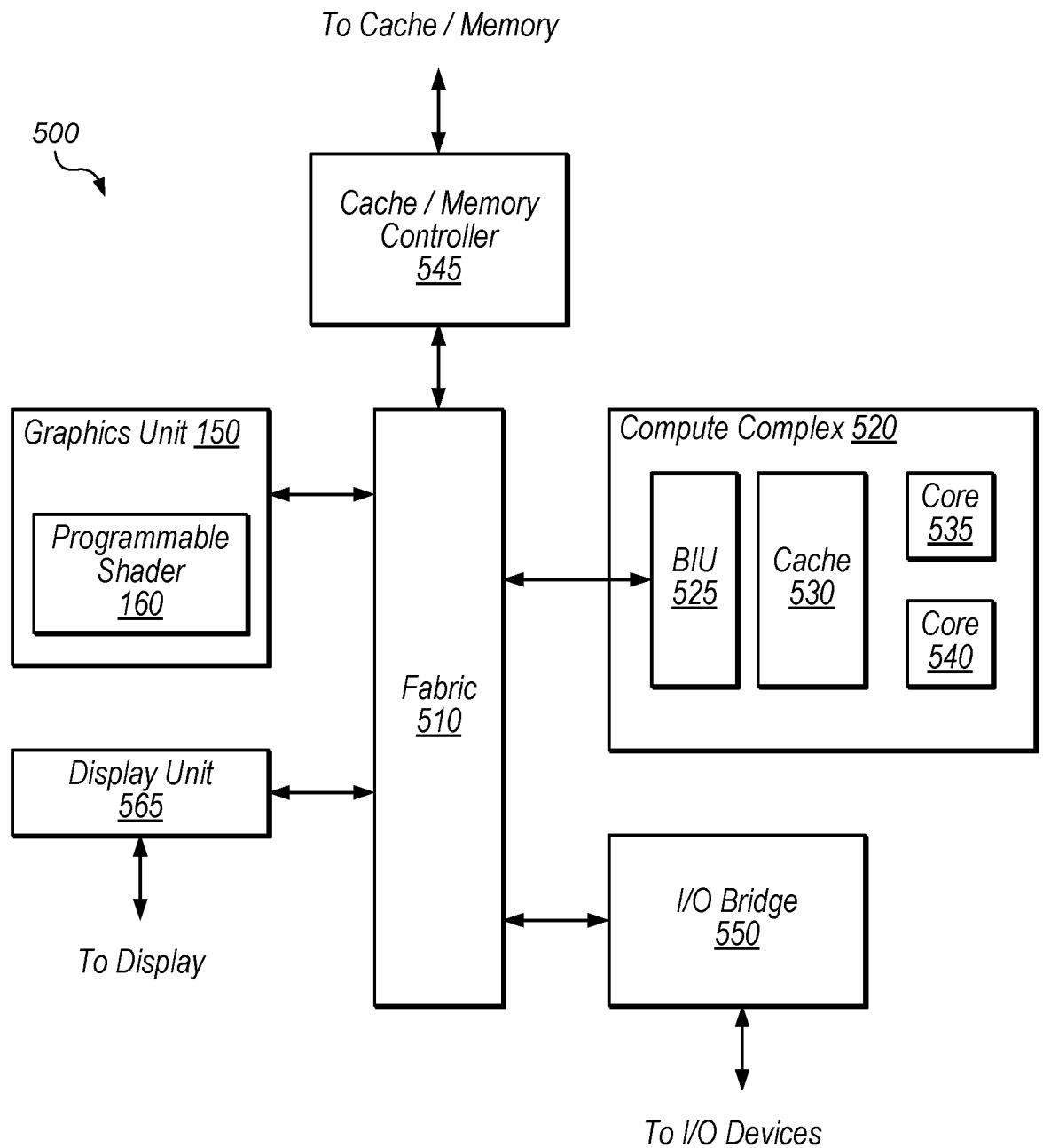
FIG. 5 is a block diagram illustrating one embodiment of a device that includes a graphics unit.

FIG. 4A is a flow diagram illustrating one exemplary embodiment of a method 400 for using a low-level GPU instruction storage such as L0 instruction storage 220. The method shown in FIG. 4A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 410.

At 410, graphics instructions are received, along with a clause identifier for each received graphics instruction. In some embodiments, ISC 240 and/or TGM 260 send the instructions and clause identifiers to a DPB 250. In some embodiments, ISC 240 fetches the instructions from memory 230, based on commands from TGM 260.

At 420, the received instructions are decoded. In some embodiments, decode circuitry 330 decodes ISA instructions by altering their format to a format used by data path circuitry 255, except that it does not expand non-native instructions until after they are stored and then retrieved from L0 storage 220.

At 430, hazard information is generated that specifies dependencies between ones of the decoded instructions that belong to the same clause. For example, if a younger instruction reads from a register to which an older instruction writes, decode circuitry 330 may detect a dependency and generate hazard information indicating the dependency. In some embodiments, the number of prior instructions checked for dependencies for an instruction being decoded corresponds to a size of an instruction buffer in the execution circuitry.

At 440, sets of instructions and the hazard information are stored in caching circuitry (e.g., in L0 storage 220). In some embodiments, hazard information for a given instruction is stored along with the instructions. In some embodiments, hazard information is stored at the clause granularity. Various encodings may be used for hazard information, such as information identifying particular location(s) of instructions that have dependencies, information specifying the number of instructions between instructions that are dependent, etc.

At 450, clauses of instructions received from the caching circuitry are performed (e.g., by one or more instances of data path circuitry 255) based on the stored hazard information. For example, data path circuitry 255 may stall instruction execution based on the hazard information to ensure correct execution of graphics programs. In other embodiments, any of various appropriate techniques may be implemented to avoid hazards indicated by the hazard information. In some embodiments, detecting hazards prior to storing decoded instructions in low-level instruction storage may reduce power consumption for clause-based instruction execution. Flow ends at 450.

Figure 4B:
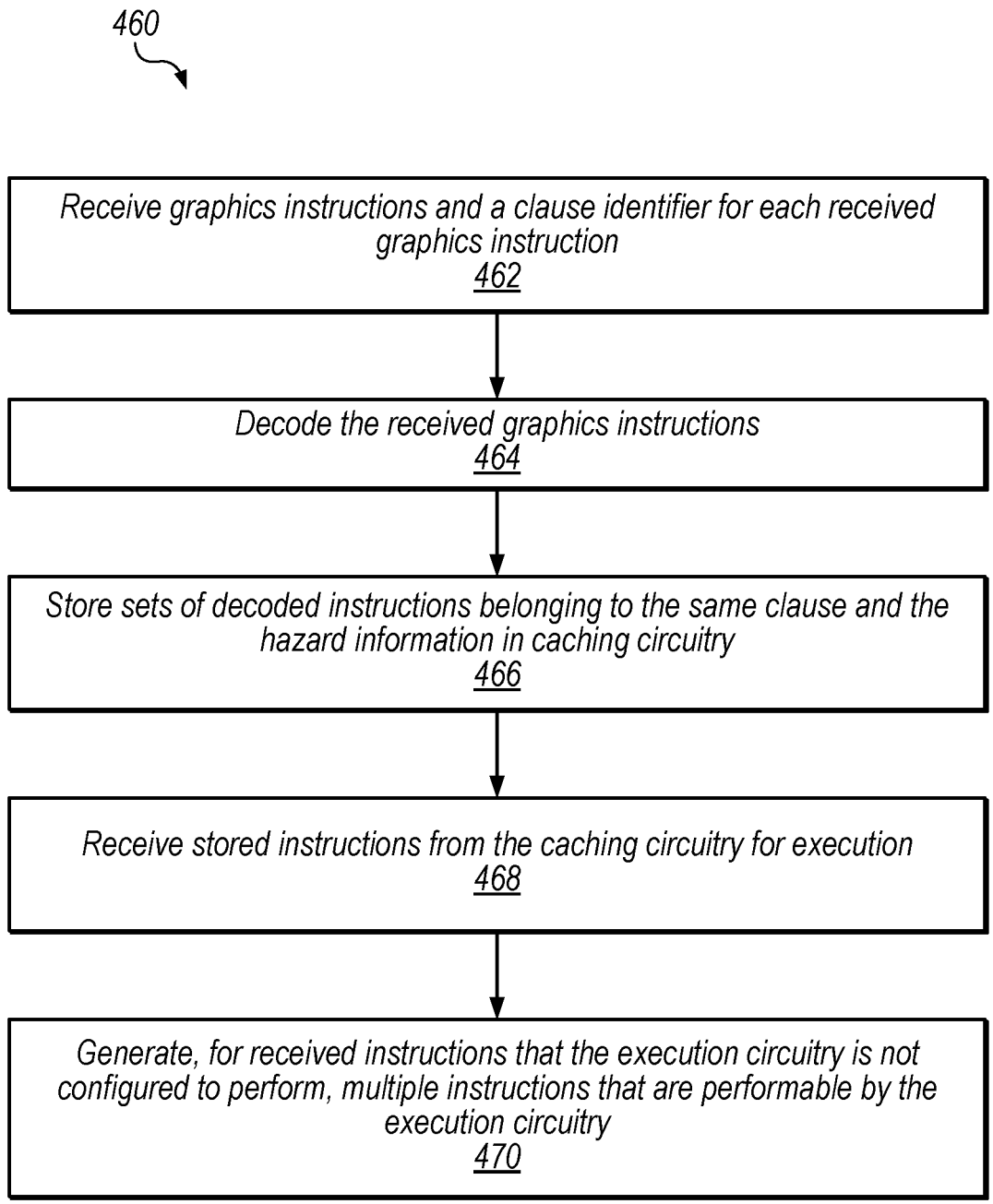

FIG. 4B is a flow diagram illustrating another exemplary embodiment of a method 460 for using a low-level GPU instruction storage such as L0 instruction storage 220. The method shown in FIG. 4B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 462.

At 462, graphics instructions are received, along with a clause identifier for each received graphics instruction. In some embodiments, ISC 240 and/or TGM 260 send the instructions and clause identifiers to a DPB 250. In some embodiments, ISC 240 fetches the instructions from memory 230, based on commands from TGM 260.

At 464, the received instructions are decoded. In some embodiments, decode circuitry 330 decodes ISA instructions by altering their format to a format used by data path circuitry 255, except that it does not expand non-native instructions until after they are stored and then retrieved from L0 storage 220.

At 466, sets of decoded instructions are stored in caching circuitry (e.g., in L0 storage 220).

At 468, clauses of instructions are received from the caching circuitry for execution (e.g., by one or more instances of data path circuitry 255). In some embodiments, circuitry 340 receives the instructions from L0 storage 220.

At 470, circuitry 340 generates, for one or more received instructions that the execution circuitry is not configured to perform, multiple instructions that are performable by the execution circuitry. Flow ends at 470.

In some embodiments, a method includes receiving instructions from the caching circuitry for execution and generating, for a received instructions that the execution circuitry is not configured to perform (e.g., a non-native instruction) multiple instructions that are performable by the execution circuitry. In some embodiments, performing instruction expansion after retrieving instructions from low-level storage may reduce the area of L0 storage 220.

Exemplary Device

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 150, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   instruction control circuitry configured to assign group identifiers to instructions, including assigning different group identifiers to different groups of instructions included in a same thread;
   caching circuitry that includes a plurality of entries configured to store, as a group, a set of instructions from the instruction control circuitry having a same group identifier; and
   execution circuitry configured to execute the instructions in parallel on input data that includes multiple different sets of input operands, wherein the execution circuitry is configured to retrieve and execute the group from the caching circuitry multiple times, for different threads, using different input data for each execution of instructions in the group, while the group is stored in an entry of the caching circuitry.

2. The apparatus of claim 1, wherein the execution circuitry is configured, once a group is invoked for execution, to execute all instructions in the group.

3. The apparatus of claim 1, wherein the caching circuitry includes multiple read ports and is configured to provide, in a given clock cycle, instructions from multiple cached groups of instructions to different sets of execution circuitry for execution in parallel.

4. The apparatus of claim 1, further comprising:
   expansion circuitry configured to:
   receive instructions from the caching circuitry for execution by the execution circuitry; and
   generate, for a received instruction that the execution circuitry is not configured to perform natively, multiple instructions that are performable by the execution circuitry.

5. The apparatus of claim 4, wherein the expansion circuitry is further configured to notify the execution circuitry when an instruction will be expanded to multiple instructions; and
   wherein the execution circuitry is configured to identify first and last instructions of executed clauses based on the notification from the expansion circuitry.

6. The apparatus of claim 1, further comprising decode circuitry configured to receive the instructions and respective group identifiers for ones of the received instructions from the instruction control circuitry, and to decode the received instructions prior to storage of the set of instructions by the caching circuitry.

7. The apparatus of claim 1, wherein the instruction control circuitry is configured to store information indicating a stream of groups of instructions to be executed for one or more threads of execution.

8. The apparatus of claim 1, wherein the caching circuitry is configured to store up to a threshold number of groups of instructions and wherein the group identifier includes a number of bits that is sufficient to uniquely identify at least the threshold number of groups of instructions.

9. The apparatus of claim 1, wherein the caching circuitry is configured to store decoded instructions using flip-flops or latches.

10. A method, comprising:
    assigning, by instruction control circuitry, respective group identifiers to instructions, including assigning different group identifiers to different groups of instructions included in a same thread;
    storing, by caching circuitry, instructions having a same group identifier as a group in an entry of the caching circuitry; and
    retrieving and executing, in parallel on input data that includes multiple different sets of input operands, multiple times by execution circuitry for different threads, the group from the caching circuitry, using different input data for each execution of instructions in the group, while the group is stored in the entry of the caching circuitry.

11. The method of claim 10, further comprising:
    providing, by the caching circuitry using multiple read ports, instructions from multiple cached groups of instructions to different sets of execution circuitry for execution in parallel.

12. The method of claim 10, further comprising:
    receiving, by expansion circuitry, instructions from the caching circuitry for execution by the execution circuitry; and
    generating, for a received instruction that the execution circuitry is not configured to perform, multiple instructions that are performable by the execution circuitry.

13. The method of claim 12, further comprising:
    notifying the execution circuitry, by the expansion circuitry, when an instruction will be expanded to multiple instructions; and
    identifying, by the execution circuitry, first and last instructions of executed groups of instructions based on the notification.

14. The method of claim 10, further comprising:
    assigning, by the instruction control circuitry, the respective group identifiers based on a threshold group size.

15. An apparatus, comprising:
    instruction control circuitry configured to:
    group instructions in a thread of instructions to be executed into groups having up to a threshold group size; and
    assign a same group identifier to respective instructions in each group, including assigning different group identifiers to different groups of instructions included in a same thread;

caching circuitry that includes a plurality of entries configured to store respective groups of instructions formed by the instruction control circuitry having up to the threshold group size; and execution circuitry configured to retrieve and execute the group from one of the plurality of entries of the caching circuitry multiple times, for different threads, using different input data for each execution of instructions the group, while the group is stored in an entry of the caching circuitry.

16. The apparatus of claim 15, further comprising:
decode circuitry configured to transmit instructions to the caching circuitry based on the group identifiers.

17. The apparatus of claim 15, wherein the instructions are single-instruction multiple-data (SIMD) instructions and the execution circuitry is configured to execute the instructions in parallel on input data that includes multiple different sets of input operands.

18. The apparatus of claim 15, wherein the execution circuitry is configured, once a group is invoked for execution, to execute all instructions in the group.

19. The apparatus of claim 15, wherein the caching circuitry includes multiple read ports and is configured to provide instructions from multiple cached groups of instructions to different sets of execution circuitry for execution in parallel.

20. The apparatus of claim 15, wherein the instruction control circuitry is configured to store information indicating a stream of groups of instructions to be executed for one or more threads of execution.

* * * * *